US009860816B2

(12) United States Patent
Komati et al.

(10) Patent No.: US 9,860,816 B2
(45) Date of Patent: Jan. 2, 2018

(54) MANAGING USAGE OF RADIO ACCESS TECHNOLOGIES IN A MULTIMODE COMMUNICATION DEVICE

(71) Applicant: QUALCOMM Incorporated, San Diego, CA (US)

(72) Inventors: Vamsi Krishna Chaitanya Komati, Hyderabad (IN); Bhaskara Viswanadham Batchu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/080,959

(22) Filed: Mar. 25, 2016

(65) Prior Publication Data
US 2017/0280367 A1    Sep. 28, 2017

(51) Int. Cl.
*H04W 36/32* (2009.01)
*H04W 48/16* (2009.01)
*H04W 64/00* (2009.01)
*H04W 36/30* (2009.01)
*H04W 88/06* (2009.01)

(52) U.S. Cl.
CPC .......... *H04W 36/32* (2013.01); *H04W 36/30* (2013.01); *H04W 48/16* (2013.01); *H04W 64/00* (2013.01); *H04W 88/06* (2013.01)

(58) Field of Classification Search
CPC ..... H04W 48/18; H04W 48/16; H04W 88/06; H04W 36/14; H04W 36/0022
See application file for complete search history.

(56) References Cited

U.S. PATENT DOCUMENTS

| 9,026,112 | B2 | 5/2015 | Klingenbrunn et al. |
| 9,107,241 | B2 | 8/2015 | Ekici et al. |
| 9,119,153 | B2 | 8/2015 | Deivasigamani et al. |
| 2008/0102835 | A1 | 5/2008 | Zhao et al. |
| 2010/0202307 | A1* | 8/2010 | Lee ................... H04W 36/0088 370/252 |
| 2010/0234010 | A1* | 9/2010 | Fischer ............... H04J 11/0093 455/422.1 |

(Continued)

FOREIGN PATENT DOCUMENTS

WO    2014198014 A1    12/2014

OTHER PUBLICATIONS

International Search Report and Written Opinion—PCT/US2017/015653—ISA/EPO—dated Jun. 16, 2017.

*Primary Examiner* — Nathan Mitchell
*Assistant Examiner* — Ernest Tacsik
(74) *Attorney, Agent, or Firm* — The Marbury Law Group, PLLC (57) ABSTRACT

Various embodiments include multimode communication devices and methods for managing usage of radio access technologies (RATs). In various embodiments, the multimode communication device may prevent scanning for a signal of higher priority RATs when a communication link is established with a lower priority RAT and the multimode communication device determines that the device is stationary. Signal characteristics of the communication link and/or other resources that can detect when the multimode communication device has moved may be monitored. In response to a change in signal characteristics or another indication that the multimode communication device has moved, scanning of higher priority RATs may be reactivated.

28 Claims, 6 Drawing Sheets

(56) References Cited

U.S. PATENT DOCUMENTS

| | | | |
|---|---|---|---|
| 2011/0059741 A1* | 3/2011 | Klein | H04W 36/30 |
| | | | 455/436 |
| 2013/0005341 A1 | 1/2013 | Welnick et al. | |
| 2013/0084856 A1 | 4/2013 | Prasad et al. | |
| 2013/0225215 A1 | 8/2013 | Kolde | |
| 2014/0066061 A1 | 3/2014 | Lou et al. | |
| 2014/0162632 A1* | 6/2014 | Gajula | H04W 24/02 |
| | | | 455/426.1 |
| 2014/0274044 A1 | 9/2014 | Lee et al. | |
| 2015/0334584 A1 | 11/2015 | Sun et al. | |
| 2016/0183192 A1 | 6/2016 | Kang et al. | |

\* cited by examiner

MANAGING USAGE OF RADIO ACCESS TECHNOLOGIES IN A MULTIMODE COMMUNICATION DEVICE

BACKGROUND

A "multimode" communication device may include one or more Subscriber Identity Module (SIM) cards that store information for accessing mobile communication networks. Each SIM card enables the communication device to communicate via a communication network, typically using a subscription (i.e., a subscriber account). Each SIM card may be associated with a different communication network that may utilize a different radio access technology (RAT), as well as a different subscription. A multimode communication device may include multiple radio frequency (RF) resource chains that each subscription may use, such as one or more cellular network transceivers, as well as one or more short-range transceivers that support RATs associated with wireless local area networks (WLANs) (e.g., a BLUETOOTH transceiver, a WI-FI transceiver, etc.).

A multimode communication device may use RATs according to a priority order, which may be defined by network operators, users, etc. When a multimode communication device is powered up, the device may attempt to detect a signal of each RAT in the priority order, and may establish a communication link with the highest-priority available RAT. If the multimode communication device establishes communication using a lower priority RAT (e.g., a second or third priority RAT), the multimode communication device will periodically scan for the availability of higher priority RAT(s), which consumes operating cycles and battery power of the multimode communication device.

SUMMARY

Various embodiments and implementations include methods implemented on a multimode communication device for managing usage of radio access technologies (RATs). Various embodiments and implementations may include preventing the multimode communication device from scanning for a signal of one or more RATs other than the RAT of an established communication link in response to determining that the RAT of the established communication link is not a highest priority RAT and that the multimode communication device is stationary.

Some implementations may further include monitoring for one or more changes in the established communication link, and scanning for a signal of the one or more RATs other than the RAT of the established communication link in response to detecting one or more changes in the established communication link. In some implementations, detecting one or more changes in the established communication link may include determining that the one or more changes in the established communication link exceed a threshold. In some implementations, detecting one or more changes in the established communication link may include determining whether a received signal strength of the established communication link has increased or decreased by an amount that exceeds a threshold.

Some implementations may further include determining whether a location of the multimode communication device has changed, and scanning for a signal of the one or more RATs other than the RAT of the established communication link in response to determining that the location of the multimode communication device has changed. In some implementations, determining whether a location of the multimode communication device has changed may include monitoring a resource that can indicate a change in location of the multimode communication device for a signal indicating that the multimode communication device has moved, and determining from the signal whether movement of the multimode communication device exceeds a threshold. In such implementations, a determination that the location of the multimode communication device has changed may be made in response to determining that the movement of the multimode communication device exceeds the threshold. In some implementations, the resource that can detect a change in location of the multimode communication device may include one or more of a global navigation satellite system receiver, a global positioning satellite system receiver, an accelerometer, a transceiver receiving a non-data bearer signal, a base station identifier, and an access point identifier.

Further embodiments include a multimode communication device including a processor configured with processor-executable instructions to perform operations of the embodiment methods summarized above. Further embodiments include a non-transitory processor-readable storage medium having stored thereon processor-executable software instructions configured to cause a processor to perform operations of the embodiment methods summarized above. Further embodiments include a multimode communication device that includes means for performing functions of the embodiment methods summarized above.

BRIEF DESCRIPTION OF THE DRAWINGS

The accompanying drawings, which are incorporated herein and constitute part of this specification, illustrate example embodiments. Together with the general description given above and the detailed description given below, the drawings serve to explain features of various embodiments, and not to limit various embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods implemented on multimode communication devices that improve resource consumption and device efficiency by managing usage of one or more RATs to avoid needless scanning for a higher priority RAT while a multimode communication device remains stationary.

The term "multimode communication device" refers to any communication device that includes a programmable processor and one or more shared RF resource chains that are configured to support communications over one or more subscriptions using a plurality of radio access technologies (RATs). Examples of multimode communication devices include cellular telephones, smartphones, laptop computers, tablet computers, smartbooks, palmtop computers, wireless electronic mail receivers, multimedia Internet enabled cellular telephones, wireless gaming controllers, and similar electronic devices.

The terms "component," "system," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A multimode communication device may include one or more SIM cards that enable the communication device to communicate via one or more cellular data communication networks, which may each communicate via different RATs (e.g., LTE, GSM, 4G, 3G, etc.). Some multimode communication devices may also be configured to perform machine type communication (MTC). Some multimode communication devices may include additional radio frequency resources, including WI-FI and BLUETOOTH transceivers, that enable communications via wireless local area network (WLAN) RATs.

In many use situations, a multimode communication device supporting active communications will remain relatively stationary for long periods of time. For example, users of mobile communication devices often stop moving to use their devices (e.g., while talking, texting, streaming media, using the devices as a soft Access Point (softAP), etc.) Also, many types of multimode communication devices are normally stationary. Some examples of normally stationary multimode communication devices include wireless water usage meters, wireless electrical usage meters, parking meters, pollution monitors, street light monitors, maintenance and repair sensors for machinery, weather and atmospheric condition sensors, personal computers, wireless access points, and "Internet of Things" devices.

Typical multimode communication devices select RATs to use for establishing communication links according to a priority order. Thus, multimode communication devices typically scan frequencies of available RATs in an attempt to establish a wireless communication link with the highest priority RAT. If a wireless communication link cannot be established with the highest priority RAT, the multimode communication device may scan for frequencies of a second highest priority RAT and continue in this manner until a wireless communication link is established. The priority of RATs may be pre-defined, such as by network operators, users, etc. For example, when a multimode communication device is powered up or recovers from an out of service condition, the device may monitor for signals of each RAT in the priority order, and establish a communication link with the highest-priority available RAT. However, if the multimode communication device establishes communication using a lower priority RAT (e.g., a second or third priority RAT), conventional multimode communication devices will periodically scan for the availability of one or more higher priority RATs.

Scanning for higher priority RATs enables the multimode communication device to use a highest priority RAT as service with such a RAT becomes available. Thus, the conventional operation of periodically scanning for higher priority RATs serves an important purpose for mobile multimode communication devices. However, if a multimode communication device remains stationary, a higher priority RAT may never become available.

Scanning for higher priority RATs consumes operating cycles and battery power of the multimode communication device. Thus, if the multimode communication device is stationary (and thus the available RATs are unlikely to change), scanning for higher priority RATs may be wasteful of communication resources, including communication bandwidth, processing resources of the multimode communication device, and stored power of the multimode communication device.

Various embodiments enable a processor of the multimode communication device to manage the usage of RATs by preventing scanning for higher priority RATs when a communication link established with a RAT that is not the highest priority RAT (a "lower priority RAT") and the device is stationary. The various embodiments reduce the consumption of wireless communication resources and power of the multimode communication device when it is unlikely that a higher priority RAT will be detected. In some embodiments, the multimode communication device may dynamically switch a communication mode from multimode to single mode while stationary.

In some embodiments, while a multimode communication device has established a communication link with a lower priority RAT, the device may monitor for one or more changes in the established communication link that may indicate movement of the device. In response to detecting one or more changes in the established communication link, the multimode communication device may again scan for higher priority RATs. In some embodiments, the multimode communication device may again scan for higher priority RATs in response to determining that one or more changes in the established communication link exceeds a threshold. In some embodiments, the communication device may dynamically switch from single mode to multimode in response to detecting one or more changes in the established communication link.

Aspects of the established communication link that may be monitored may include a traffic channel, a pilot channel, one or more out-of-band channels, and other channels. For example, the multimode communication device may monitor for a change in the strength of receive signals from the established communication link. Either an increase or decrease in signal strength of the established communication link may indicate that the multimode communication device has moved with respect to the access point with which the device is communicating. As another example, the multimode communication device may monitor for a change in the error rate, such as packet loss or block error rate (BER), of the established communication link, which may occur when the device moves relative to access point with which the device is communicating. As another example, the multimode communication device may monitor for a change in an access point identifier, a base station identifier, a timing error correction, and/or an access channel Comparing the observed change in signal strength, error rate and/or other indication of movement to a threshold may enable the multimode communication device to reactivate scanning for higher priority RATs only when the change is significant enough to indicate a substantial change in location of the device (i.e., the device has moved far enough that a higher priority RAT may have become available).

In some embodiments, multimode communication device may also or alternatively determine whether the multimode communication device is stationary by monitoring one or more resources (other than the communication link) that can indicate whether the location of the multimode communication device is changed. Examples of resources or events that can indicate whether the location of the multimode communication device is changed include global navigation satellite system (GNSS) receivers, such as Global Positioning System (GPS) receivers, accelerometers, other RAT receivers (e.g., a Wi-Fi transceiver that may detect signals from an access point), location information received from the network with which the communication link is established, a change in base station identity (ID) on the established communication link. In some embodiments, changes in location that are detected by the multimode communication device may be compared to a threshold distance, and a determination made that the location has changed and scanning of higher priority RATs should be conducted in response to the change in location exceeding the threshold distance. For example, the multimode communication device may determine whether the multimode communication device has moved beyond a threshold radius or area based upon GPS coordinates within a threshold period of time. If the multimode communication device detects a change in the location of the multimode communication device, the multimode communication device may reactivate scanning of various RATs (which may be in a priority order) to determine whether a higher priority RAT is available.

Figure 1:
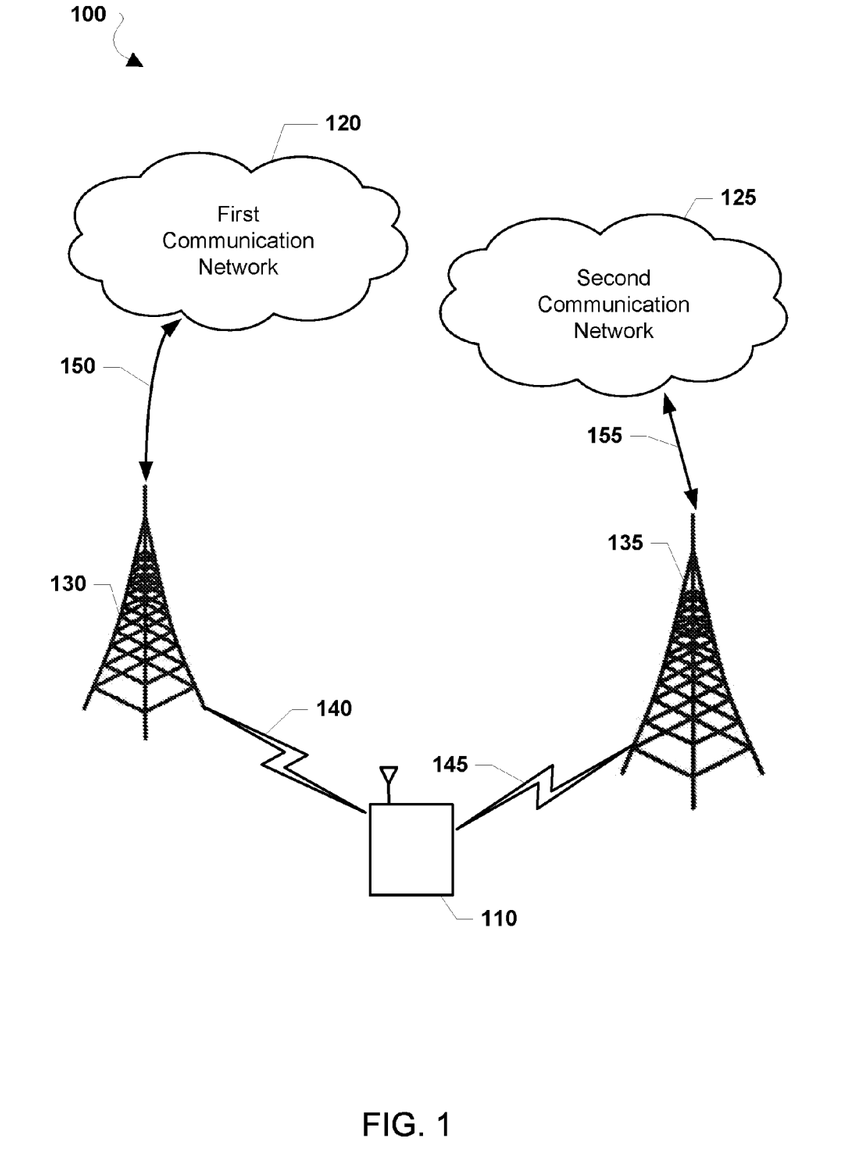
FIG. 1 is a component block diagram of a communication system suitable for use with various embodiments.

Various embodiments may be implemented in multimode communication devices that may operate within a variety of communication systems particularly systems that include two or more communication networks. FIG. 1 illustrates a communication system 100 suitable for use with various embodiments. A multimode communication device 110 may communicate with the first communication network 120 through a communication link 140 to the first base station 130. The multimode communication device 110 may also communicate with the second communication network 125 through a communication link 145 to the second base station 135. The first base station 130 may communicate with the first communication network 120 over a wired or wireless communication link 150, and the second base station 135 may communicate with the second communication network 125 over a wired or wireless communication link 155. The communication links 150 and 155 may include fiber optic backhaul links, microwave backhaul links, and other suitable communication links.

Each of the communication networks 120 and 125 may support communications using one or more RATs, and each of the wireless communication links 140 and 145 may include cellular connections that may be made through two-way wireless communication links using one or more RATs. Examples of RATs may include 3GPP Long Term Evolution (LTE), Global System for Mobility (GSM), Code Division Multiple Access (CDMA), WCDMA, Time Division Multiple Access (TDMA), Worldwide Interoperability for Microwave Access (WiMAX), Single-Carrier Radio Transmission Technology (1×RTT), Evolution-Data Optimized (EV-DO), and other RATs. RATs may also include short-range communication protocols of the Institute of Electrical and Electronics Engineers (IEEE) 802 family of protocols (e.g., WI-FI, ZIGBEE, BLUETOOTH, etc.). While the communication links 140 and 145 are illustrated as single links, each of the communication links may include a plurality of frequencies or frequency bands, each of which may include a plurality of logical channels. Additionally, each of the communication links 140 and 145 may utilize more than one RAT.

Figure 2:
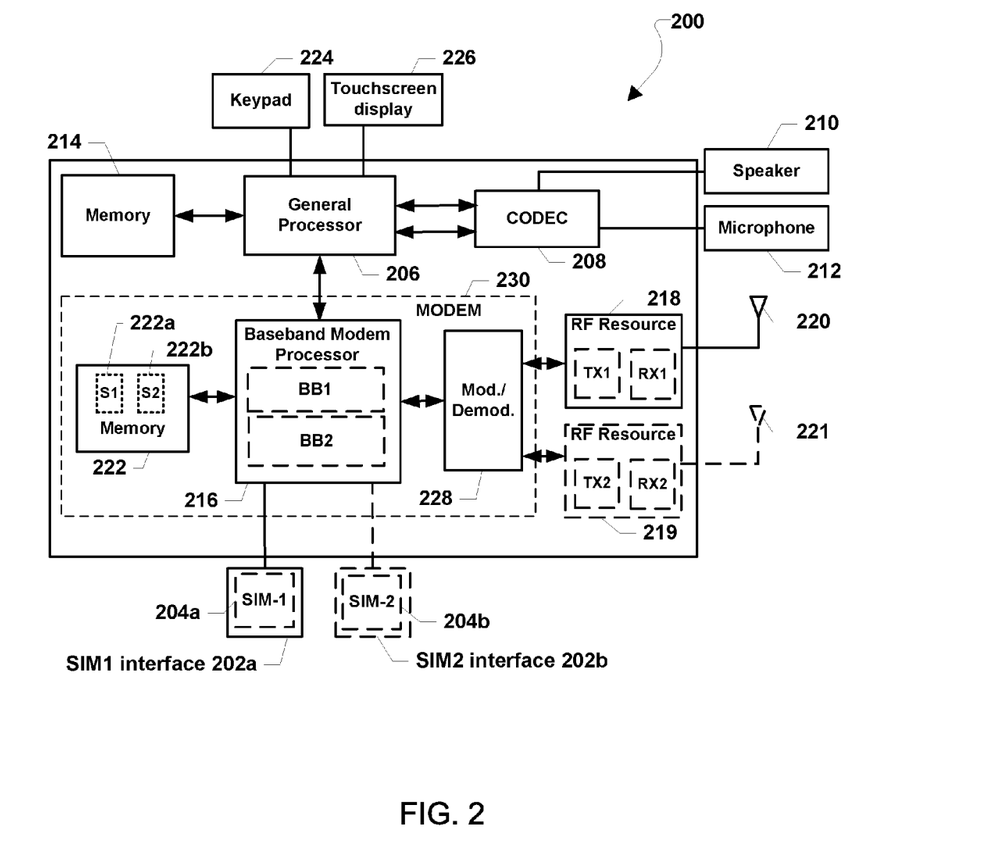
FIG. 2 is a component block diagram of a multimode communication device according to various embodiments.

FIG. 2 is a component block diagram of a multimode communication device 200 suitable for implementing various embodiments. With reference to FIGS. 1 and 2, in various embodiments, the multimode communication device 200 may be similar to the multimode communication device 110. The multimode communication device 200 may include a first SIM interface 202a, which may receive a first identity module SIM-1 204a that may be associated with a first subscription. The multimode communication device 200 may optionally also include a second SIM interface 202b, which may receive a second identity module SIM-2 204b that may be associated with a second subscription.

A SIM in various embodiments may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The multimode communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to the RF resource chain 218 for transmission. The modulator/demodulator 228 may also extract an information-bearing signal from a modulated carrier wave received from the RF resource chain 218, and may provide the demodulated signal to the baseband modem processor 216. The modulator/demodulator 228 may be or include a digital signal processor (DSP).

In some optional embodiments, the multimode communication device 200 may include an optional RF resource chain 219 configured similarly to the RF resource chain 218 and coupled to an optional wireless antenna 221. In such embodiments, the multimode communication device 200 may leverage the multiple RF resource chains 218, 219 and antennae 220, 221 to perform diversity receiver reception during a tune-away event.

The baseband modem processor 216 may read and write information to and from the memory 222. The memory 222 may also store instructions associated with a protocol stack, such as protocol stack S1 222a and protocol stack S2 222b. The protocol stacks S1 222a, S2 222b generally include computer executable instructions to enable communication using a radio access protocol or communication protocol. Each protocol stack S1 222a, S2 222b typically includes network protocol layers structured hierarchically to provide networking capabilities. The modem 230 may include one or more of the protocol stacks S1 222a, S2 222b to enable communication using one or more RATs. The protocol stacks S1 222a, S2 222b may be associated with a SIM card (e.g., SIM-1 204a, SIM-2 204b) configured with a subscription. For example, the protocol stack S1 222a and the protocol stack S2 222b may be associated with the SIM-1 204a. The illustration of only two protocol stacks S1 222a, S2 222b is not intended as a limitation, and the memory 222 may store more than two protocol stacks (not illustrated).

Each SIM and/or RAT in the multimode communication device 200 (e.g., SIM-1 204a, SIM-2 204b) may be coupled to the modem 230 and may be associated with or permitted to use an RF resource chain. The term "RF resource chain" refers to all of the circuitry used to send and/or receive RF signals. For example, an RF resource chain may include the baseband modem processor 216 that performs baseband/modem functions for communicating with/controlling a RAT, one or more radio units including transmitter and receiver components that are shown as RF resource chain 218, one or more wireless antenna 220, and additional circuitry that may include one or more amplifiers and radios. A multimode communication device 200 may also include an optional RF resource chain 219 and an optional wireless antenna 221. In some embodiments, an RF resource chain may share a common baseband modem processor 216 (i.e., a single device that performs baseband/modem functions for all RATs on the multimode communication device). In some embodiments, each RF resource chain may include the physically or logically separate baseband processors (e.g., BB1, BB2).

The RF resource chains 218, 219 may include transceivers associated with one or more RATs and may perform transmit/receive functions for the multimode communication device on behalf of their respective RATs. The RF resource chains 218, 219 may include separate transmit and receive circuitry. In some embodiments, the RF resource chain 218 may include only receive circuitry. The RF resource chains 218, 219 may each be coupled to a wireless antenna (e.g., the first wireless antenna 220 and the second wireless antenna 221). The RF resource chains 218, 219 may also be coupled to the modem 230 (e.g., via the modulator/demodulator 228, the baseband modem processor 216, or another component).

In some embodiments, the general-purpose processor 206, memory 214, baseband processor(s) 216, and the RF resource chains 218, 219 may be included in the multimode communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the multimode communication device 200 may include, but are not limited to, a keypad 224 and a touchscreen display 226.

In some embodiments, the keypad 224, the touchscreen display 226, the microphone 212, or a combination thereof may perform the function of receiving the request to initiate an outgoing call. For example, the touchscreen display 226 may receive a selection of a contact from a contact list and/or may receive a telephone number. In another example, either or both of the touchscreen display 226 and microphone 212 may perform the function of receiving a request to initiate an outgoing call. As another example, the request to initiate the outgoing call may be in the form of a voice command received via the microphone 212. Interfaces may be provided between the various software modules and functions in the multimode communication device 200 to enable communication between them.

Functioning together, the two SIMs 204a, 204b, the baseband processor(s) 216, RF resource chains 218, 219, and the antennas 220, 221 may enable communications on two or more RATs. For example, one SIM, baseband processor, and RF resource chain may be configured to support two different RATs. In some embodiments, more RATs may be supported on the multimode communication device 200 by adding more SIM cards, SIM interfaces, RF resource chains, and antennas for connecting to additional mobile networks.

Figure 3:
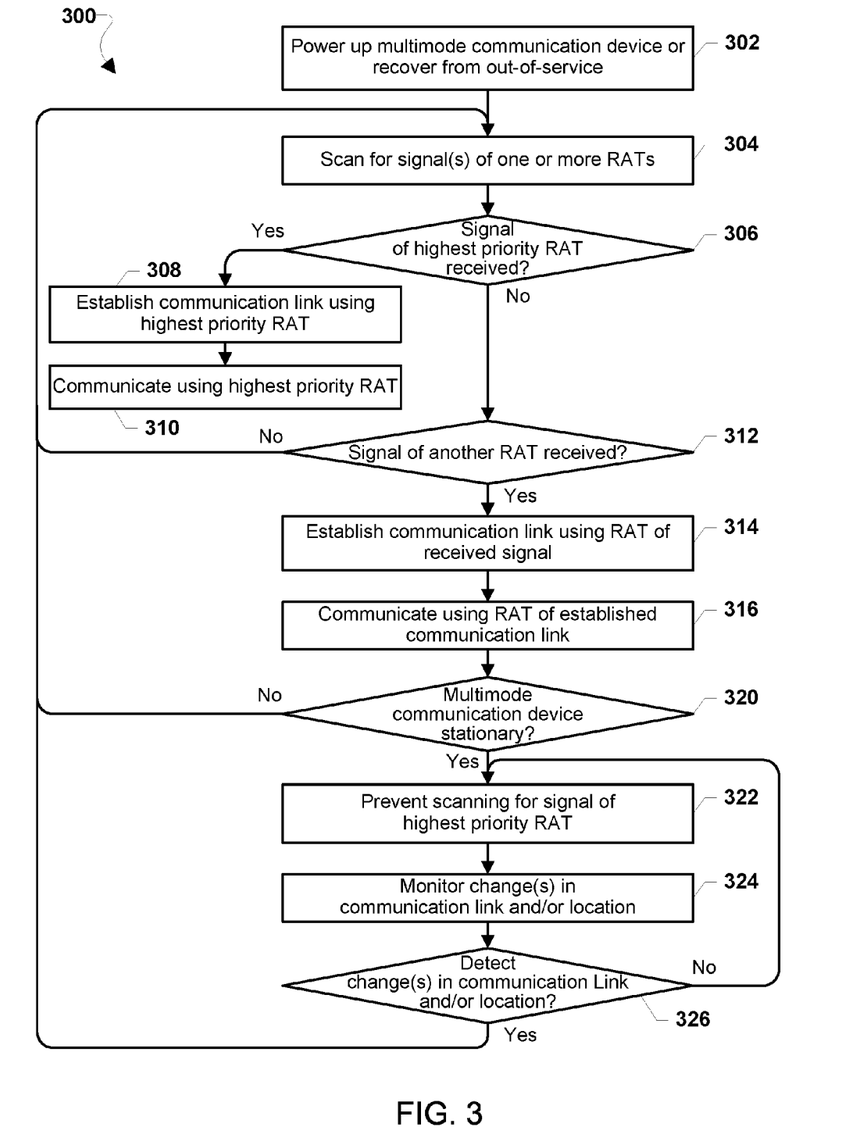
FIG. 3 is a process flow diagram illustrating a method for managing usage of RATs in a multimode communication device according to various embodiments.

FIG. 3 illustrates a method 300 for managing usage of radio access technologies in a multimode communication device (e.g., the multimode communication device 110, 200 of FIGS. 1 and 2) according to some embodiments. With reference to FIGS. 1-3, the method 300 may be implemented by a multimode communication device (e.g., the multimode communication device 110, 200), such as under the control of a processor (e.g., the general-purpose processor 206, the baseband processor 216, a separate controller, and/or the like) of the multimode communication device (i.e., a device processor).

In block 302, the method 300 may be initiated when the processor performs a power up process of the multimode communication device (i.e., the processor may power up the multimode communication device) or recovers from an out-of-service condition. In block 304, the processor may scan for one or more signals of one or more RATs transmitted by one or more networks and/or access points. In some implementations, the processor may scan for the signals of the one or more RATs in a priority order of RATs. Such priority order may be implemented by a network operator, or by a user of the multimode communication device. In some implementations, the priority order may be set or updated using an over-the-air (OTA) signal.

In determination block 306, the processor may determine whether the processor has received a signal of a highest priority RAT. In some implementations, the highest priority RAT may be a RAT with the highest available data throughput and/or data rate from among a list of RATs. The list of RATs may be the priority list of RATs.

In response to determining that the processor has received a signal of the highest priority RAT (i.e., determination block 306="Yes"), the processor may establish a communication link using the highest priority RAT in block 308. For example, the processor may establish the communication link with a base station of a communication network (e.g., the base station 130, 135). In block 310, the processor may communicate using the highest priority RAT. If the processor determines that one or more metrics of the communication link using the highest priority RAT drops below a threshold (such as a signal strength or signal quality dropping below a threshold, e.g., due to degradation or loss of signal), the processor may repeat the method 300.

In response to determining that the processor has not received a signal of the highest priority RAT (i.e., determination block 308="No"), the processor may determine whether it has received a signal of another RAT (i.e., a RAT that is not the highest priority RAT) in determination block 312. In some implementations, the processor may receive two or more signals of other RATs, and may select a highest-priority RAT from among the two or more other RATs. In some implementations, the processor may scan for one or more signals of other RATs (i.e., not the highest priority RAT) in the priority order. In response to determining that the processor has not received a signal of another RAT (i.e., determination block 312="No"), the device processor may continue to scan for signals of one or more RATs in block 304.

In response to determining that the processor has received a signal of another RAT (i.e., a RAT that is not the highest priority RAT) (i.e., determination block 312="Yes"), the device processor may establish a communication link using the RAT of the received signal in block 314. For example, the processor may establish the communication link with a base station of a communication network (e.g., the base station 130, 135). In block 316, the processor may communicate using the RAT of the established communication link.

In determination block 320, the processor may determine whether the multimode communication is stationary. For example, the processor may determine whether one or more characteristics of the established communication link have not changed by a threshold amount and/or the multimode communication device has remained within a threshold radius or area for a threshold period of time.

The processor may determine whether the multimode communication device is stationary or has moved using a variety of mechanisms and resources that can detect a change in location of the multimode communication device.

In some implementations, the processor may monitor one or more aspects of the communication link. For example, the processor may monitor a signal level of the established communication link. A signal from a communication network may include a signal from a cellular access point, a signal from a short-range access point (e.g., WI-FI), and other similar signals. In various embodiments, the multimode communication device may monitor the signal of the communication link for one or more changes in the signal. The signal of the communication link may include one or more channels, such as a traffic channel, a pilot channel, one or more out-of-band channels, and other channels. A change in the communication link may include a decrease or increase in a signal strength of the communication link beyond a threshold, an increase or decrease in packet loss rate, an increase or decrease in a block error rate, a change in the modulation and coding scheme (MCS) used to communicate over the communication link, or another change in communication link conditions that indicates that the multimode communication device has moved from its previous stationary location. In some implementations, the processor may determine that the multimode communication device is not stationary in response to determining that one or more aspects of the communication link signal have changed beyond a threshold level. In some implementations, the processor may determine that the multimode communication device is not stationary in response to determining that one or more aspects of the communication link signal have changed beyond a threshold level within a threshold period of time.

Additionally or alternatively, the processor may determine whether the multimode communication device is stationary using one or more resources, other than a resource related to the established communication link, that can detect a change in location of the multimode communication device. Examples of such other resources include one or more of information received from a GNSS or GPS receiver, an accelerometer, other RAT receivers (e.g., a WI-FI transceiver that may detect signals from an access point), a transceiver that receives a non-data bearer signal (e.g., a pilot signal, a control signal, or another similar signal that does not carry bearer data traffic, e.g., that may be used for base station/access point triangulation), and one or more base station/access point identifiers. In some implementations, the processor may determine that the multimode communication device is not stationary in response to determining that the location of the multimode communication device has changed beyond a threshold distance within a threshold period of time. The threshold distance may be a threshold radius or a threshold area.

In response to determining that the multimode communication device is not stationary (i.e., determination block 320="No"), the processor may continue to scan for one or more signals of one or more RATs in block 304.

In response to determining that the multimode communication device is stationary (i.e., determination block 320="Yes") and that a communication link is established with a RAT that is not the highest priority RAT (block 314), the processor may prevent or block scanning for a signal of the highest priority RAT in block 322.

In block 324, the processor may monitor for one or more changes in the communication link and/or the location of the multimode communication device. The processor may do so by monitoring the signal characteristics and/or resources discussed above with respect to determination block 320. For example, the processor may monitor for a decrease or increase in a signal strength of the communication link beyond a threshold, an increase or decrease in packet loss rate, an increase or decrease in a block error rate, a change in the modulation and coding scheme (MCS) used to communicate over the communication link, or another change in communication link conditions that indicates that the multimode communication device has moved from its previous stationary location. The processor may determine that the multimode communication device has moved or is no longer stationary (and therefore RAT scanning should be reactivated) in response to determining that one or more aspects of the communication link signal and/or the location of the multimode communication device have changed beyond a threshold level.

Additionally or alternatively, as part of the operations of block 324, the processor may determine whether the multimode communication device is stationary using other resources that can detect a change in location of the device. For example, the processor may monitor a resource that can detect a change in location of the multimode communication device for a signal indicating that the multimode communication device has moved. The resource may include one or more of a GNSS/GPS receiver, other RAT receivers, location information received from the network with which the communication link is established, base station/access point triangulation, and one or more base station/access point identifiers. For example, the processor may detect a change in information received by a GNSS or GPS receiver, or from a communication network, indicating that the multimode communication device is stationary, or has moved. As another example, the processor may perform base station triangulation to determine the location of the multimode communication device. As another example, the processor may detect a new base station or access point identifier, or may detect the loss of a base station or access point identifier, which may indicate that the multimode communication device has moved.

Further as part of the operations in block 324, the processor may also determine that the multimode communication device has moved or is not stationary by monitoring one or more aspects of the communication link signal and/or the location of the multimode communication device to determine whether these parameters have changed beyond a threshold level within a threshold period of time.

In determination block 326, the processor may determine whether one or more changes in the communication link and/or the location of the multimode communication device are detected (e.g., beyond a threshold level). This determination enables the processor to detect when the multimode communication device has moved far enough that is possible that a higher priority RAT has become available.

In response to determining that one or more changes in the communication link and/or the location of the multimode communication device are not detected (i.e., determination block 326="No"), the processor may continue to prevent or block scanning for a signal of the highest priority RAT in block 322.

In response to determining that one or more changes in the communication link and/or the location of the multimode communication device are detected (i.e., determination block 326="Yes"), the processor may reactivate scanning for one or more signals of one or more RATs in block 304.

Figure 4:
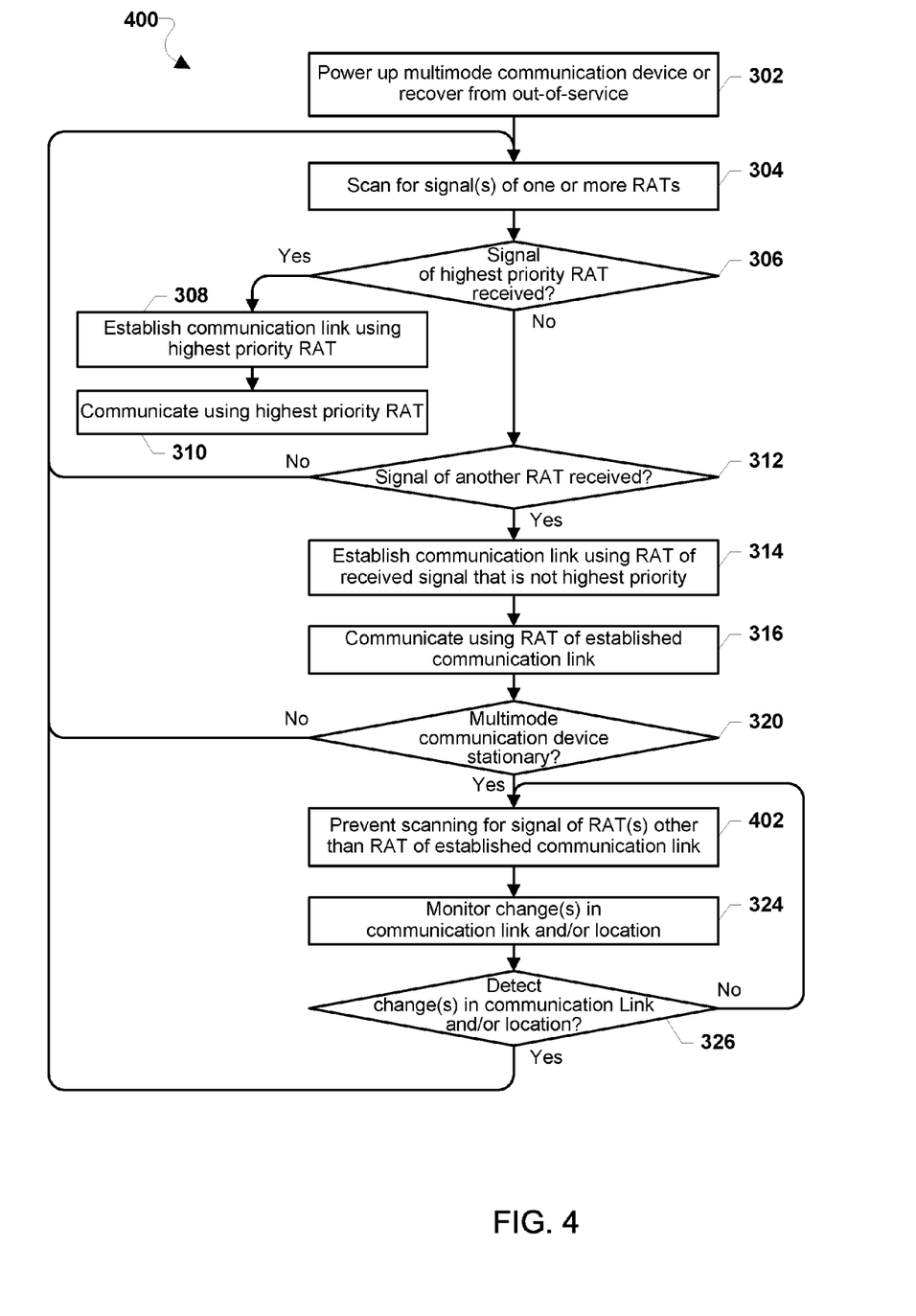
FIG. 4 is process flow diagram illustrating a method for managing usage of RATs in a multimode communication device according to various embodiments.

FIG. 4 illustrates a method 400 for managing usage of radio access technologies in a multimode communication device (e.g., the multimode communication device 110, 200 of FIGS. 1 and 2) according to some embodiments. With reference to FIGS. 1-4, the method 400 may be implemented by a multimode communication device (e.g., the multimode communication device 110, 200), such as under the control of a processor (e.g., the general-purpose processor 206, the baseband processor 216, a separate controller, and/or the like) of the multimode communication device (i.e., a device processor). In blocks 302-320 and 326, the processor may perform operations of like-numbered blocks of the method 300 as described with reference to FIG. 3.

In block 402, in response to determining that the multimode communication device is stationary (i.e., determination block 320="Yes"), the processor may prevent (or block) scanning for a signal of RATs other than the RAT of the established communication link. That is, in some situations in which the processor has determined that a signal of the highest priority RAT is not received, the processor may establish the communication link using a signal of another RAT. Further, the processor may block or prevent scanning for any other signals of other RATs other than the signal that the processor is using to communicate while the multimode communication device remains stationary.

Thus, various embodiments may improve the operation of a multimode communication device by dynamically disabling or preventing a scan of one or more signals of RATs other than a signal/RAT that the multimode communication device is using for communication while the multimode communication device is stationary. The multimode communication device may thereby reduce unnecessary consumption of communication resources and power. Various embodiments may particularly improve the operation of multimode communication devices that are configured to perform machine type communication (MTC).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 300 may be substituted or combined with one or more operations of the method 400 and vice versa.

Figure 5:
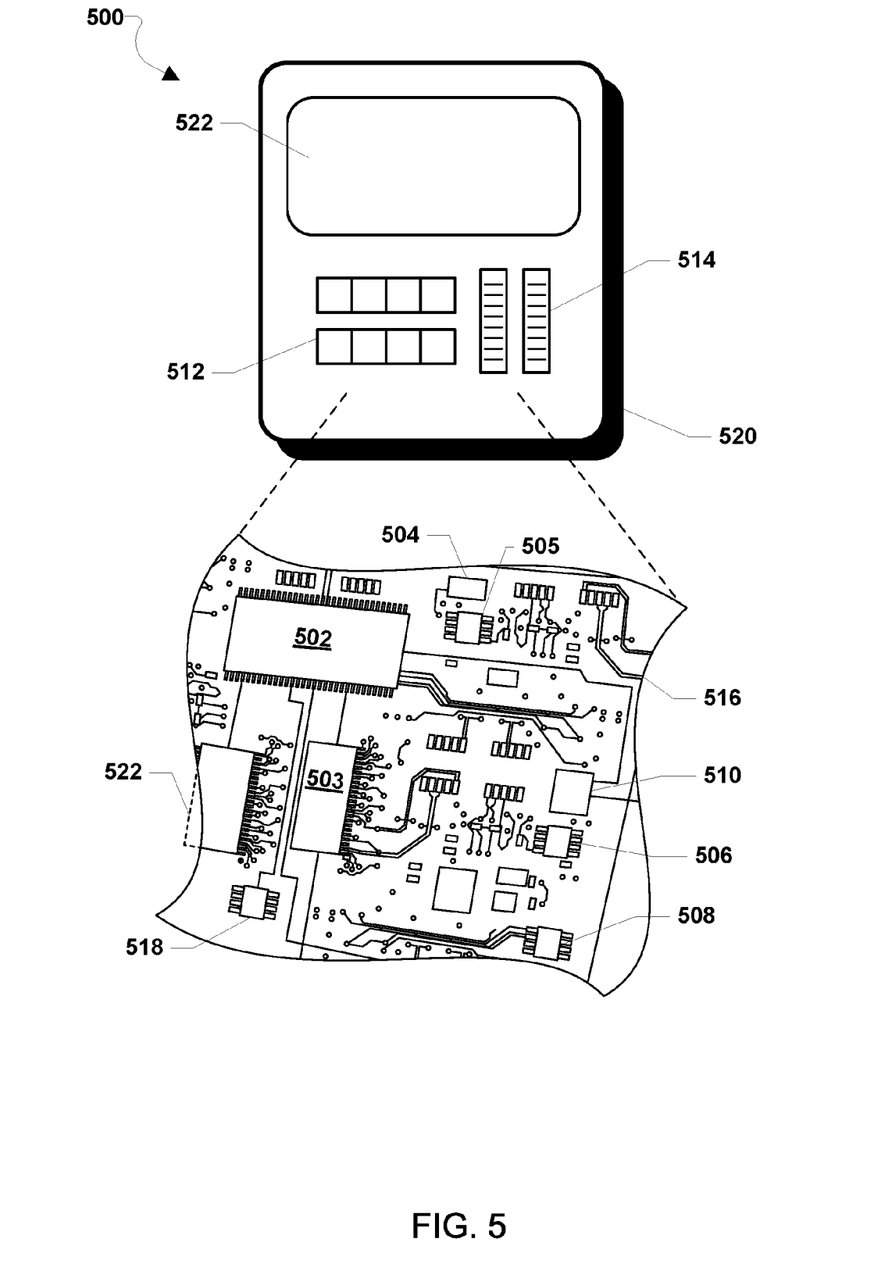
FIG. 5 is a component block diagram of a multimode communication device suitable for use with various embodiments.
Figure 6:
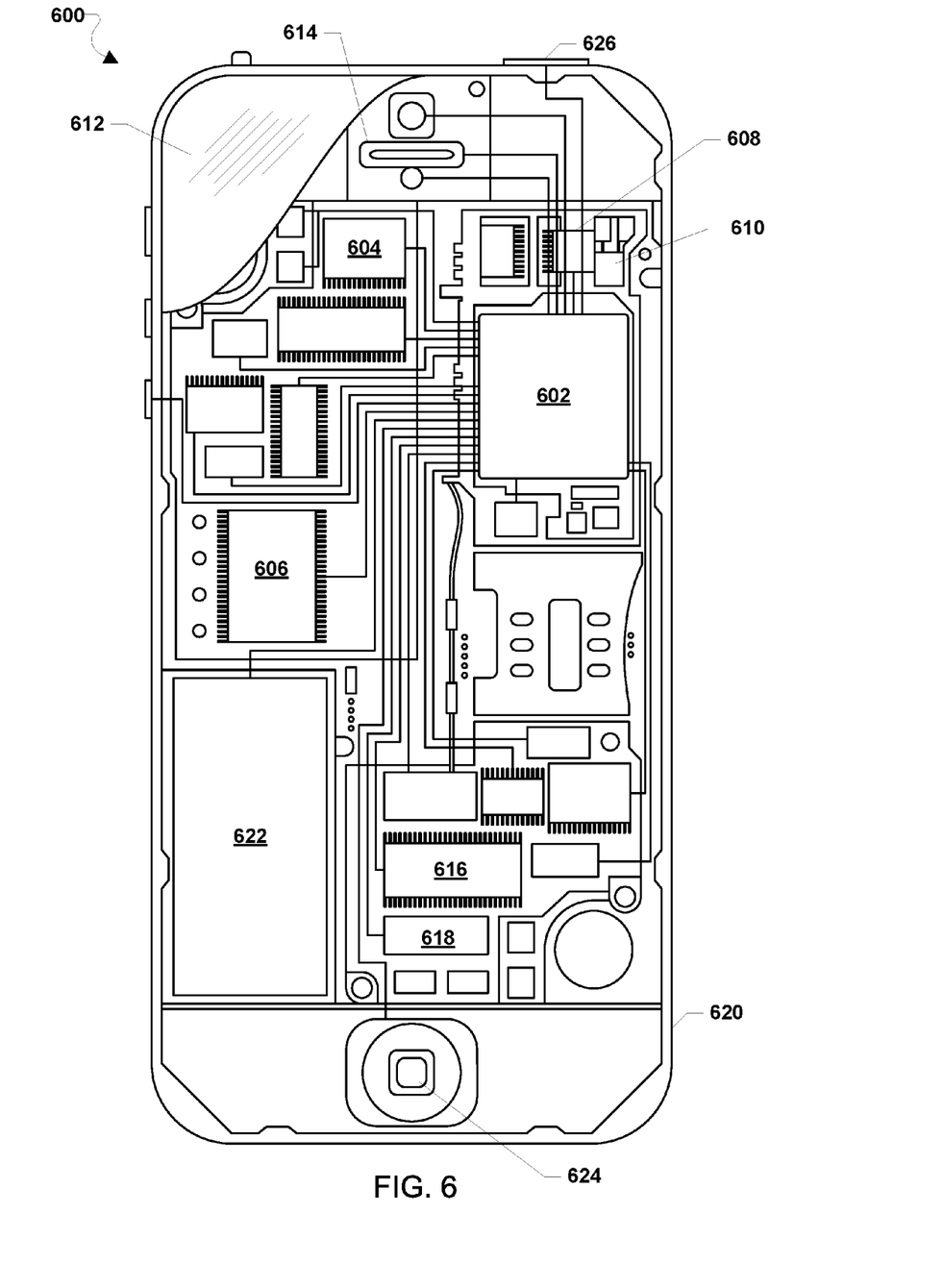
FIG. 6 is a component block diagram of a multimode communication device suitable for use with various embodiments.

Various embodiments may be implemented in any of a variety of multimode communication device, examples of which (e.g., multimode communication devices 500 and 600) are illustrated in FIGS. 5 and 6. In various embodiments, the multimode communication device 500 and 600 may be similar to the multimode communication devices 110 and 200 as described with reference to FIGS. 1 and 2. As such, the multimode communication devices 500 and 600 may implement the methods 300 and 400.

With reference to FIGS. 1-5, the multimode communication device 500 may include a processor 502 coupled to internal memory 503. The multimode communication device 500 may include an antenna 504 for sending and receiving electromagnetic signals and a wireless signal transceiver 505 for sending and receiving communications, coupled to each other and/or to the processor 502. The transceiver 505 and antenna 504 may be used with the above-mentioned circuitry to implement the various wireless transmission protocol stacks and interfaces. The multimode communication device 500 may include one or more cellular network wireless modem chip(s) 510 coupled to the processor 502 and antenna 504 that enables communication via one or more communication networks via one or more RATs.

The processor 502 may be one or more multi-core integrated circuits designated for general or specific processing tasks. The internal memory 503 may be volatile or non-volatile memory, and may also be secure and/or encrypted memory, or unsecure and/or unencrypted memory, or any combination thereof. The processor 502 may also be coupled to a display 522 of the multimode communication device, which may include a touchscreen panel, such as a resistive-sensing touchscreen, capacitive-sensing touchscreen, infrared sensing touchscreen, etc. Additionally, the display 522 need not have touch screen capability. The multimode communication device 500 may also include one or more physical buttons 512, 514, for receiving inputs.

The multimode communication device 500 may include one or more communication interfaces 518 that may be coupled to the processor 502, to enable the multimode communication device to communicate with one or more other devices or systems. In some implementations, the communication interfaces 518 may enable the multimode communication device 500 to conduct machine type communication with the one or more other devices or systems.

The multimode communication device 500 may include an accelerometer 506 coupled to the processor 502 that may be used to detect movement of the device. The multimode communication device 500 may also include one or more sensors 508 that may be coupled to the processor 502. The sensors 508 may be configured to detect one or more inputs, signals, or conditions of a connected other device or system.

The multimode communication device 500 may include a power source 522 coupled to the processor 502, such as a disposable or rechargeable battery. The multimode communication device 500 may also include a housing 520, constructed of a plastic, metal, or a combination of materials, for containing all or some of the components discussed herein.

With reference to FIGS. 1-4 and 6, in various embodiments, the multimode communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the multimode communication device 600 need not have touch screen capability.

The multimode communication device 600 may have two or more radio signal transceivers 608 (e.g., PEANUT, ZIG-BEE, WI-FI, RF radio) and antennae 610, for sending and receiving communications, coupled to each other and/or to the processor 602. The transceivers 608 and antennae 610 may be used with the above-mentioned circuitry to implement the various wireless transmission protocol stacks and interfaces. The multimode communication device 600 may include one or more cellular network wireless modem chip(s) 616 coupled to the processor and antennae 610 that enables communication via two or more cellular networks via two or more radio access technologies.

The multimode communication device 600 may include a peripheral device connection interface 618 coupled to the processor 602. The peripheral device connection interface 618 may be singularly configured to accept one type of connection, or may be configured to accept various types of physical and communication connections, common or proprietary, such as USB, FireWire, Thunderbolt, or PCIe. The peripheral device connection interface 618 may also be coupled to a similarly configured peripheral device connection port (not shown).

The multimode communication device 600 may also include speakers 614 for providing audio outputs. The multimode communication device 600 may also include a housing 620, constructed of a plastic, metal, or a combination of materials, for containing all or some of the components discussed herein. The multimode communication device 600 may include a power source 622 coupled to the processor 602, such as a disposable or rechargeable battery. The rechargeable battery may also be coupled to the peripheral device connection port to receive a charging current from a source external to the multimode communication device 600. The multimode communication device 600 may also include a physical button 624 for receiving user inputs.

The multimode communication device 600 may also include a power button 626 for turning the multimode communication device 600 on and off.

The processors 502 and 602 may be any programmable microprocessor, microcomputer or multiple processor chip or chips that can be configured by software instructions (applications) to perform a variety of functions, including the functions of various embodiments described below. In some mobile wireless devices, multiple processors 502 and 602 may be provided, such as one processor dedicated to wireless communication functions and one processor dedicated to running other applications. Typically, software applications may be stored in the internal memory 503, 606 before they are accessed and loaded into the processors 502 and 602. The processors 502 and 602 may include internal memory sufficient to store the application software instructions.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method implemented on a multimode communication device for managing usage of radio access technologies (RATs), comprising:
    determining whether a RAT of an established communication link is not a highest priority RAT;
    determining whether the location of the multimode communication device remains within a threshold radius for a threshold period of time;
    preventing the multimode communication device from scanning for a signal of any RAT other than the RAT of the established communication link in response to determining that the RAT of the established communication link is not a highest priority RAT and while the location of the multimode communication device remains within the threshold radius for the threshold period of time.

2. The method of claim 1, further comprising:
    monitoring for one or more changes in the established communication link; and
    scanning for a signal of one or more RATs other than the RAT of the established communication link in response to detecting one or more changes in the established communication link.

3. The method of claim 2, wherein detecting one or more changes in the established communication link comprises determining that the one or more changes in the established communication link exceed a threshold.

4. The method of claim 2, wherein detecting one or more changes in the established communication link comprises determining whether a received signal strength of the established communication link has increased or decreased by an amount that exceeds a threshold.

5. The method of claim 1, further comprising:
    scanning for a signal of one or more RATs other than the RAT of the established communication link in response to determining that the location of the multimode communication device moves beyond the threshold radius within the threshold period of time.

6. The method of claim 1, wherein determining whether the location of the multimode communication device remains within the threshold radius for the threshold period of time comprises:
    monitoring a resource that can detect a change in location of the multimode communication device for a signal indicating that the multimode communication device has moved; and
    determining from the signal whether the location of the multimode communication device remains within the threshold radius for the threshold period of time.

7. The method of claim 6, wherein the resource that can detect a change in location of the multimode communication device comprises one or more of a global navigation satellite system receiver, a global positioning satellite system receiver, an accelerometer, a transceiver receiving a non-data bearer signal, a base station identifier, and an access point identifier.

8. A multimode communication device, comprising:
    a radio frequency (RF) resource configured to support a plurality of radio access technologies (RATs); and
    a processor coupled to the RF resource and configured with processor-executable instructions to perform operations comprising:
        determining whether a RAT of an established communication link is not a highest priority RAT;
        determining whether the location of the multimode communication device remains within a threshold radius for a threshold period of time;
        preventing the multimode communication device from scanning for a signal of any RAT other than the RAT of the established communication link in response to determining that the RAT of the established communication link is not a highest priority RAT and while the location of the multimode communication device remains within the threshold radius for the threshold period of time.

9. The multimode communication device of claim 8, wherein the processor is configured with processor-executable instructions to perform operations further comprising:
    monitoring for one or more changes in the established communication link; and
    scanning for a signal of one or more RATs other than the RAT of the established communication link in response to detecting one or more changes in the established communication link.

10. The multimode communication device of claim 9, wherein the processor is configured with processor-executable instructions to perform operations such that detecting one or more changes in the established communication link comprises determining that the one or more changes in the established communication link exceed a threshold.

11. The multimode communication device of claim 9, wherein the processor is configured with processor-executable instructions to perform operations such that detecting one or more changes in the established communication link comprises determining whether a received signal strength of the established communication link has increased or decreased by an amount that exceeds a threshold.

12. The multimode communication device of claim 8, wherein the processor is configured with processor-executable instructions to perform operations further comprising:
scanning for a signal of one or more RATs other than the RAT of the established communication link in response to determining that the location of the multimode communication device moves beyond the threshold radius within the threshold period of time.

13. The multimode communication device of claim 8, wherein the processor is configured with processor-executable instructions to perform operations such that determining whether the location of the multimode communication device remains within the threshold radius for the threshold period of time-comprises:
monitoring a resource that can detect a change in location of the multimode communication device for a signal indicating that the multimode communication device has moved; and
determining from the signal whether the location of the multimode communication device remains within the threshold radius for the threshold period of time.

14. The multimode communication device of claim 13, wherein the resource that can detect a change in location of the multimode communication device comprises one or more of a global navigation satellite system receiver, a global positioning satellite system receiver, an accelerometer, a transceiver receiving a non-data bearer signal, a base station identifier, and an access point identifier.

15. A non-transitory processor-readable storage medium having stored thereon processor-executable instructions configured to cause a processor of a multimode communication device to perform operations for managing usage of radio access technologies (RATs), comprising:
determining whether a RAT of an established communication link is not a highest priority RAT;
determining whether the location of the multimode communication device remains within a threshold radius for a threshold period of time;
preventing the multimode communication device from scanning for a signal of any RAT other than the RAT of the established communication link in response to determining that the RAT of the established communication link is not a highest priority RAT and while the location of the multimode communication device remains within the threshold radius for the threshold period of time.

16. The non-transitory processor-readable storage medium of claim 15, wherein the stored processor-executable instructions are configured to cause the processor of the multimode communication device to perform operations further comprising:
monitoring for one or more changes in the established communication link; and
scanning for a signal of one or more RATs other than the RAT of the established communication link in response to detecting one or more changes in the established communication link.

17. The non-transitory processor-readable storage medium of claim 16, wherein the stored processor-executable instructions are configured to cause the processor of the multimode communication device to perform operations such that detecting one or more changes in the established communication link comprises determining that the one or more changes in the established communication link exceed a threshold.

18. The non-transitory processor-readable storage medium of claim 16, wherein the stored processor-executable instructions are configured to cause the processor of the multimode communication device to perform operations such that detecting one or more changes in the established communication link comprises determining whether a received signal strength of the established communication link has increased or decreased by an amount that exceeds a threshold.

19. The non-transitory processor-readable storage medium of claim 15, wherein the stored processor-executable instructions are configured to cause the processor of the multimode communication device to perform operations further comprising:
scanning for a signal of one or more RATs other than the RAT of the established communication link in response to determining that the location of the multimode communication device moves beyond the threshold radius within the threshold period of time.

20. The non-transitory processor-readable storage medium of claim 15, wherein the stored processor-executable instructions are configured to cause the processor of the multimode communication device to perform operations such that determining whether the location of the multimode communication device remains within the threshold radius for the threshold period of time comprises:
monitoring a resource that can detect a change in location of the multimode communication device for a signal indicating that the multimode communication device has moved; and
determining from the signal whether the location of the multimode communication device remains within the threshold radius for the threshold period of time.

21. The non-transitory processor-readable storage medium of claim 20, wherein the resource that can detect a change in location of the multimode communication device comprises one or more of a global navigation satellite system receiver, a global positioning satellite system receiver, an accelerometer, a transceiver receiving a non-data bearer signal, a base station identifier, and an access point identifier.

22. A multimode communication device, comprising:
means for determining whether a radio access technology (RAT) of an established communication link is not a highest priority RAT;
means for determining whether the location of the multimode communication device remains within a threshold radius for a threshold period of time;
means for preventing the multimode communication device from scanning for a signal of any RAT other than the RAT of the established communication link in response to determining that the RAT of the established communication link is not a highest priority RAT and while the location of the multimode communication device remains within the threshold radius for the threshold period of time.

23. The multimode computing device of claim 22, further comprising:
means for monitoring for one or more changes in the established communication link; and
means for scanning for a signal of one or more RATs other than the RAT of the established communication link in response to detecting one or more changes in the established communication link.

24. The multimode computing device of claim 23, wherein means for detecting one or more changes in the established communication link comprises means for determining that the one or more changes in the established communication link exceed a threshold.

25. The multimode computing device of claim 23, wherein means for detecting one or more changes in the established communication link comprises means for determining whether a received signal strength of the established communication link has increased or decreased by an amount that exceeds a threshold.

26. The multimode computing device of claim 22, further comprising:

means for scanning for a signal of the one or more RATs other than the RAT of the established communication link in response to determining that the location of the multimode communication device moves beyond the threshold radius within the threshold period of time.

27. The multimode computing device of claim 22, wherein means for determining whether the location of the multimode communication device remains within the threshold radius for the threshold period of time comprises:

means for monitoring a resource that can detect a change in location of the multimode communication device for a signal indicating that the multimode communication device has moved; and means for determining from the signal whether the location of the multimode communication device remains within the threshold radius for the threshold period of time.

28. The multimode computing device of claim 27, wherein the resource that can detect a change in location of the multimode communication device comprises one or more of a global navigation satellite system receiver, a global positioning satellite system receiver, an accelerometer, a transceiver receiving a non-data bearer signal, a base station identifier, and an access point identifier.

* * * * *